United States Patent [19]

Okino et al.

[11] 4,232,062
[45] Nov. 4, 1980

[54] METHOD OF COATING GLASS SURFACE WITH HEAT-REFLECTIVE TITANIUM OXIDE FILM

[75] Inventors: Seiki Okino; Kunio Nakata; Tosiharu Yanai; Takayoshi Kandachi, all of Matsusaka, Japan

[73] Assignee: Central Glass Company, Limited, Ube, Japan

[21] Appl. No.: 20,464

[22] Filed: Mar. 14, 1979

[30] Foreign Application Priority Data

Mar. 16, 1978 [JP] Japan .................................. 53-29307

[51] Int. Cl.² .............................................. B05B 5/00
[52] U.S. Cl. .................................. 427/160; 260/429 J; 427/226; 427/314; 427/421; 427/372.2
[58] Field of Search .................... 260/429 J; 65/60 D; 427/226, 160, 421, 383 B, 314, 372 R, 165, 168

[56] References Cited

U.S. PATENT DOCUMENTS

| | | | |
|---|---|---|---|
| 3,414,429 | 12/1968 | Bruss et al. | 427/226 |
| 3,619,235 | 11/1971 | Furuuchi | 427/226 |
| 3,660,137 | 5/1971 | Furuuchi | 427/226 |
| 3,716,567 | 2/1973 | Termin et al. | 260/429 J |

FOREIGN PATENT DOCUMENTS 1943527  3/1971  Fed. Rep. of Germany ........... 427/226

Primary Examiner—Ronald H. Smith
Assistant Examiner—Janyce A. Bell
Attorney, Agent, or Firm—Fleit & Jacobson

[57] ABSTRACT

A method of coating a glass surface with a heat-reflecting titanium oxide film, which may optionally comprise other metal oxide(s), by thermal decomposition of a titanium compound contained in a solution applied onto the glass surface. The coating is achieved with improved heat reflectivity and adhesion strength by using an organic solvent solution comprising a chelated titanium compound having at least one propoxy group or butoxy group and at least one octyleneglycol chelate ligand.

11 Claims, 3 Drawing Figures

METHOD OF COATING GLASS SURFACE WITH HEAT-REFLECTIVE TITANIUM OXIDE FILM

BACKGROUND OF THE INVENTION

This invention relates to a method of coating a glass surface with a heat-reflecting metal oxide film comprising titanium oxide. This method is particularly suitable for application to the production of a heat-reflecting glass plate.

The use of heat-reflecting glass plates as window panes or wall panels in buildings and vehicles has been prevailing with the objects of avoiding unwanted rise in the interior temperature and reducing the heat load on the interior air conditioning.

A heat-reflecting glass plate is obtained by coating one side of a glass plate with a certain metal oxide film such as of cobalt oxide, chromium oxide, iron oxide, nickel oxide, tin oxide and/or titanium oxide. The coating is accomplished by heating a solution of a metal salt (or metal salts) applied onto a glass surface to cause thermal decomposition of the metal salt(s) to metal oxide(s), for example, by spraying the solution onto a heated glass surface. At present, typical examples of titanium compounds used to form titanium oxide on a glass surface are alkyl titanates, titanium acylates, tetrachlorotitanium and titanium tetraoctyleneglycoxide. However, a titanium oxide coating, or a metal oxide coating comprising a large amount of titanium oxide, produced through thermal decomposition of a conventionally utilized titanium compound is unsatisfactory in its reflectivity to thermal rays and inferior to other kinds of metal oxide coatings in adhesion to the glass surface.

SUMMARY OF THE INVENTION

It is an object of the present invention to provide a method of coating a glass surface with a heat-reflecting metal oxide film which comprises titanium oxide as its essential component and is excellent both in reflectivity to thermal rays and in adhesion to the glass surface.

In a method according to the invention, a surface of a glass body is coated with a heat-reflecting metal oxide film, which comprises titanium oxide as an essential component thereof, by applying a solution containing a thermally decomposable titanium compound dissolved in an organic solvent onto the glass surface and heating the solution applied to the glass surface so as to cause thermal decomposition of the titanium compound to titanium oxide. The improvement according to the invention resides in that said thermally decomposable titanium compound is a chelated titanium compound having at least one alkoxy group selected from propoxy groups and butoxy groups and at least one octyleneglycol chelate ligand.

It is preferable that said at least one alkoxy group is at least one isopropoxy group, and it is more preferable that the chelated titanium compound has at least two isopropoxy groups. Also it is preferable that the chelated titanium compound has one octyleneglycol ligand and acetylacetonato as an additional chelate ligand.

Preferably the heating of the solution on the glass surface is accomplished by preheating the glass body so as to maintain the glass surface at a temperature in the range from about 500° C. to about 600° C. and spraying the solution onto the heated glass surface, though it is also possible to first wet the glass surface with the solution and then heat the wetted glass body.

When it is intended to form a heat-reflecting coating which consists essentially of titanium oxide, the solution in a method according to the invention is prepared by dissolving solely a chelated titanium compound according to the above definition in an organic solvent. If desired, however, the solution may be prepared by using two or more kinds of chelated titanium compounds each according to the above definition.

A method of the invention is applicable also to the production of a heat-reflecting metal oxide coating (on a glass surface) which comprises not only titanium oxide but also at least one other metal oxide such as the oxide or oxides of cobalt, chromium, iron, nickel, tin, manganese, aluminum, indium, zinc, silicon and/or arsenic. In this case, the solution in a method of the invention is prepared by dissolving conventionally utilized metal salt(s) as the material(s) of the additional metal oxide(s) in an organic solvent together with a chelated titanium compound according to the above definition.

We have discovered that a titanium oxide film can be formed on a glass surface with satisfactory reflectivity to thermal rays and excellent adhesion to the glass surface by thermal decomposition of a chelated titanium compound which comprises two types of ligands or radicals different in the tendency of thermal decomposition, that is, a first type of ligand(s) which undergoes thermal decomposition relatively readily and a second type of ligand(s) which are relatively hard to decompose. Based on this discovery, we have found that the use of a chelated titanium compound having at least one propoxy group or butoxy group as the first type of ligand(s) or radical(s) and at least one octyleneglycol molecule as the second type of ligand(s) gives a titanium oxide film of best quality.

DESCRIPTION OF THE PREFERRED EMBODIMENTS

Chelated titanium compounds suitable for use in a method according to the present invention are those expressed by the following general formula:

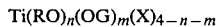

$$Ti(RO)_n(OG)_m(X)_{4-n-m}$$

where RO represents either a propoxy group or a butoxy group, OG represents octyleneglycol, X represents another kind of chelate ligand, and n and m are integers conditioning that $1 \leq n \leq 3$, $1 \leq m \leq 3$, and $2 \leq n+m \leq 4$. For example, the chelate ligand represented by X may be acetylacetonato, triethanolamine, propionic acid or methyl acetoacetate.

Typical examples of the chelated titanium compounds for use in a method of the invention are titanium diisopropoxy-bisoctyleneglycoxide, titanium diisopropoxy-monooctyleneglycoxy-monoacetylacetonate, titanium isopropoxy-trioctyleneglycoxide, titanium tripropoxy-octyleneglycoxide and titanium isopropoxy-octyleneglycoxy-diacetylacetonate, and those compounds which have butoxy group(s) in place of the propoxy group(s) in these propoxy-containing chelate compounds.

A titanium oxide film formed on a glass surface by the method of the invention is superior in adhesion to the glass surface to titanium oxide films formed from conventionally utilized organotitanium compounds. The reason for an improved adhesion strength of a titanium oxide film formed in accordance with the present invention may be explained as follows.

Figure 1:
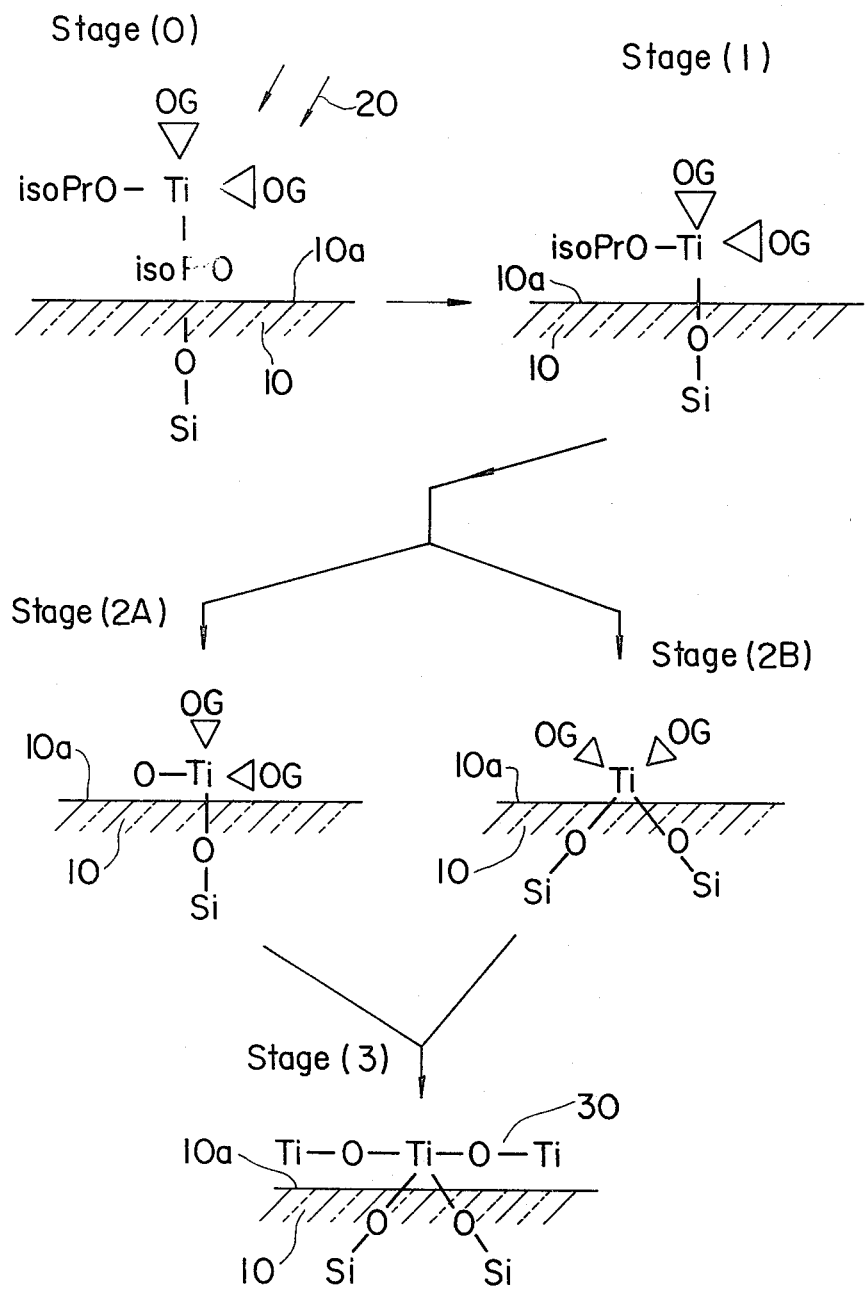
FIG. 1 is a diagram explanatorily illustrating the process of the formation of a titanium oxide film on a glass plate in a method according to the invention.

FIG. 1 illustrates the process of the formation of a titanium oxide film on a glass plate 10 by thermal decomposition of titanium diisopropoxy-bisoctyleneglycoxide, an example of chelate compounds used in the present invention. The glass plate 10 is preheated to a suitable temperature, usually in the range of 500°–600° C., and a solution of titanium diisopropoxy-bisoctyleneglycoxide in a suitable organic solvent such as methylene chloride is sprayed (indicated by arrows 20) onto a surface 10a of the heated glass plate 10. The boiling point, or the decomposition temperature, of the solvent is far lower than a temperature at which the dissolved chelate compound decomposes.

As the sprayed solution 20 approaches the heated glass surface 10a (Stage (0) in FIG. 1), the solvent undergoes evaporation (possibly through decomposition) due to heat radiated from the glass surface 10a, but titanium diisopropoxy-bisoctyleneglycoxide in the solution is hardly decomposed until it arrives at the glass surface 10a.

At Stage (1), i.e. immediately after arrival of the chelate compound in the solution at the glass surface 10a, the isopropoxy groups in this compound first undergo thermal decomposition since they are most weakly bonded in this compound. The decomposition of the isopropoxy groups allows the titanium ion in each molecule of the chelate compound to bond with an oxygen ion contained in the glass composition and present on the glass surface 10a, meaning that Ti-O bonds are formed between the glass surface 10a and the molecules of the chelate compound deposited thereon. Upon completion of the decomposition of the isopropoxy groups, the partially decomposed chelate compound on the glass surface 10a may be expressed by Stage (2A) and/or Stage (2B) in FIG. 1. Since the partially decomposed compound in this state is very unstable, soon begins the decomposition of the octyleneglycol molecules. As the decomposition proceeds, the titanium ion reacts mainly with oxygen in the atmosphere to form $TiO_2$. As a consequence the glass surface 10a is coated with a thin film 30 of $TiO_2$ as shown at Stage (3) in FIG. 1. In the titanium oxide coating 30 formed through the illustrated process, a considerable portion of the titanium ions have strong chemical bonds with oxygen ions in the glass composition constituting the plate 10. Accordingly the titanium oxide film 30 exhibits a greatly improved adhesion strength. Besides, this film 30 is formed in a dense and uniform structure and hence exhibits a high reflectivity to thermal rays.

A titanium oxide film of a better quality is obtained by the use of a chelated titanium compound comprising an isopropoxy group than the use of a corresponding compound comprising a normal propoxy group, and the presence of two isopropoxy groups in the chelate compound is more favorable. The reason for this fact is presumed to be as follows.

A normal propoxy group in each molecule of a chelated titanium compound, i.e. a ligand having a straight chain structure, is less stable in its state of coordination than an isopropoxy group in a similarly coordinating state. Moreover, the effect of the decomposition of the normal propoxy group on the coordination state of the octyleneglycol ligands in the same molecule is less than that of the isopropoxy group. In the case of the chelate compound comprising normal propoxy group(s), therefore, the titanium ion in this compound will remain in an unstable state for a relatively long period of time during thermal decomposition of this compound on the glass surface 10a through a process as illustrated in FIG. 1 and, therefore, will be affected chemically by certain substances formed by the decomposition. This presumption gives an explanation also to the advantageousness of the presence of two isopropoxy groups in the chelate compound than the presence of only one isopropoxy group particularly with respect to the adhesion strength of a titanium oxide film formed by thermal decomposition of the chelate compound.

In the case of chelated titanium compounds comprising butoxy group(s), there is little difference in effect between n-butoxy, iso-butoxy and tert-butoxy groups.

In a method according to the invention, i.e. spraying of a solution comprising a selected chelate compound of titanium onto a heated glass surface, the chelate compound does not begin to decompose before its arrival at the glass surface. Thermal decomposition of this compound on the glass surface is initially limited to the decomposition of only one of propoxy groups, or butoxy groups, in each molecule of this compound. During such a manner of partial decomposition the titanium ion in the molecule is allowed to combine with an oxygen ion in the glass. After formation of a chemical bond between the titanium ion and the oxygen ion, there occurs decomposition of the remaining propoxy group(s) or butoxy group(s), accompanied with an abrupt change in the coordination state of the titanium ion. Then octyleneglycol ligands in the same molecule undergo a rapid decomposition reaction, and at the same time the titanium ion readily combines with oxygen in the atmosphere to form $TiO_2$ without reacting with any other substances formed by the decomposition of the chelate ligands.

A chelated titanium compound used in the present invention has a relatively high decomposition temperature and, when heated, remains stable until the temperature reaches the decomposition temperature. Furthermore, this compound must have two types of ligands or radicals different in decomposition tendency such that an initial stage of thermal decomposition of this compound is the decomposition of only one of the two types of ligands or radicals to allow the titanium ion to establish a Ti-O bond with an oxygen ion in a glass plate (on which the chelated compound is heated), while the other of the ligands or radicals remains undecomposed during the initial stage but rapidly decomposes after establishment of the aforementioned Ti-O bond. This requirement is met by a combination of either propoxy group(s) or butoxy group(s) and octyleneglycol ligands as will be understood from the explanation given hereinbefore with reference to FIG. 1. From the same reason, acetylacetone is exceedingly advantageous as the additional chelate ligand(s) X in the general formula when the chelate compound has only one octyleneglycol ligand.

In contrast, titanium compounds conventionally used in the production of heat-reflecting glass plates have only one type of radical(s) in regard of decomposition tendency. In the case of a titanium compound having readily decomposable radical(s) alone, thermal decomposition of such a compound on a glass surface proceeds too rapidly to form a titanium oxide film of a uniform quality. In the case of a titanium compound having relatively stable radical(s) alone, the rate of thermal decomposition is too low to form a sufficiently dense titanium oxide film.

The invention will be illustrated by the following examples.

EXAMPLE 1

An organic solvent used in this example was a mixture of dichloromethane (75% by volume) and methanol (25% by volume). In this solvent, titanium diisopropoxy-bisoctylenegylcoxide was dissolved to prepare a solution containing 40% by volume of this chelate compoumd. Using a spray gun, this solution was sprayed onto a surface of a 30 cm×30 cm wide and 6 mm thick plate of soda-lime glass, which had been heated and maintained at a temperature between 500° C. and 600° C. The spraying was continued for a period of 10-20 sec at a constant spraying rate of 3 ml/sec, whereby the glass surface was coated with a titanium oxide film. To examine the effect of the temperature at which the chelate compound in the sprayed solution was decomposed on the quality of the coating, five kinds of samples were produced by varying the glass temperature to 500° C., 525° C., 550° C., 575° C. and 600° C.

The coated samples were subjected to the following tests to examine the adhesive strength and durability of the titanium oxide film on each sample.

(a) Abrasion Resistance Test

Each coating was rubbed with a sand-containing rubber eraser in the following manner.
Pressure applied to the eraser: 2 kg/cm$^2$
Rubbing speed: 2 reciprocating strokes per second
Distance of stroke: 5 cm
Total rubbing: 100 reciprocating strokes
The criterion of the evaluation of the strength of the tested coatings was as follows.

Rank A: no or little abrasion perceptible.
Rank B: some abrasion perceptible, but no peeling.
Rank C: peeling of the coating up to about 20% of the entire area.
Rank D: peeling of the coating up to about 50% of the entire area.
Rank E: peeling of a major portion of the coating.

(b) Alkali Resistance Test

The samples were immersed in 1 N NaOH solution maintained at 20° C. until the coating of each sample became damaged.

(c) Acid Resistance Test

The samples were immersed in 10% HCl solution maintained at 20° C. until the coating of each sample became damaged.

(d) SO$_2$ Resistance Test

The samples were confined in a desiccator which was filled with pure SO$_2$ gas and maintained at 20° C. until the coating of each sample became damaged.

In the tests (b), (c) and (d), each sample was judged to be damaged upon recognition of either peeling of the coating, even locally, or discoloring of the coating to a perceptible extent.

The results of these tests are presented in Tables 1 and 2 together with test results obtained in the following examples and comparative experiments.

EXAMPLES 2-5

These examples were similar to Example 1 except that the following chelate compounds were used in place of the chelate compound used in Example 1.
Example 2: titanium dinormalpropoxy-bisoctyleneglycoxide
Example 3: titanium dinormalbutoxy-bisoctyleneglycoxide
Example 4: titanium diisopropoxy-monooctyleneglycoxy-acetylacetonate
Example 5: titanium dinormalbotoxy-monooctyleneglycoxy-acetylacetonate

COMPARATIVE EXPERIMENTS 1-3

These experiments were similar to Example 1 except that the following titanium compounds, which are not in accordance with the present invention, were used in place of the compound used in Example 1.
Experiment 1: titanium tetraoctyleneglycoxide
Experiment 2: titanium dinormalpropoxy-acetylacetonate
Experiment 3: titanium butoxystearate

TABLE 1

| | Abrasion Resistance Glass Plate Temperature (°C.) | | | | | SO$_2$ gas Resistance (days) Glass Plate Temperature (°C.) | | | | |
|---|---|---|---|---|---|---|---|---|---|---|
| | 500 | 252 | 550 | 575 | 600 | 500 | 525 | 550 | 575 | 600 |
| Example 1 | B | B | A | A | A | 18 | 35< | 35< | 35< | 35< |
| Example 2 | C | B | B | A | A | 14 | 23 | 35< | 35< | 35< |
| Example 3 | B | B | A | A | A | 15 | 28 | 35< | 35< | 35< |
| Example 4 | C | B | A | A | A | 14 | 24 | 35< | 35< | 35< |
| Example 5 | C | B | B | A | A | 12 | 21 | 35< | 35< | 35< |
| Comparative Experiment 1 | E | E | E | D | C | 3 | 3 | 5 | 9 | 13 |
| Comparative Experiment 2 | E | E | D | C | B | 5 | 7 | 10 | 15 | 17 |
| Comparative Experiment 3 | E | E | D | D | B | 4 | 5 | 10 | 10 | 15 |

TABLE 2

| | Alkali Resistance Glass Plate Temperature (°C.) | | | | | Acid Resistance (days) Glass Plate Temperature (°C.) | | | | |
|---|---|---|---|---|---|---|---|---|---|---|
| | 500 | 525 | 550 | 575 | 600 | 500 | 525 | 550 | 575 | 600 |
| Example 1 | 11 | 14< | 14< | 14< | 14< | 7 | 14< | 14< | 14< | 14< |
| Example 2 | 6 | 9 | 14< | 14< | 14< | 6 | 14< | 14< | 14< | 14< |
| Example 3 | 7 | 10 | 14< | 14< | 14< | 7 | 14< | 14< | 14< | 14< |
| Example 4 | 5 | 9 | 14< | 14< | 14< | 6 | 10 | 14< | 14< | 14< |
| Example 5 | 5 | 7 | 14< | 14< | 14< | 6 | 10 | 14< | 14< | 14< |
| Comparative Experiment 1 | 0.5 | 0.5 | 0.5 | 3 | 5 | 0.5 | 0.5 | 1 | 3 | 6 |
| Comparative Experiment 2 | 0.5 | 1 | 2 | 5 | 7 | 0.5 | 1 | 3 | 5 | 8 |
| Comparative Experiment 3 | 0.5 | 0.5 | 1 | 3 | 7 | 0.5 | 0.5 | 2 | 4 | 7 |

As can be understood from the test results presented in Tables 1 and 2, titanium oxide coating of every sample produced in Examples 1 to 5 was excellent in abrasion resistance, alkali resistance, acid resistance and $SO_2$ gas resistance and, from a practical viewpoint, was judged to be quite satisfactory in the adhesive strength of the coating to the glass plate. The advantageousness of using a chelated titanium compound selected in the present invention is demonstrated also by the inferior results obtained in the comparative experiments in which were used titanium compounds not in accordance with the invention.

Figure 2:
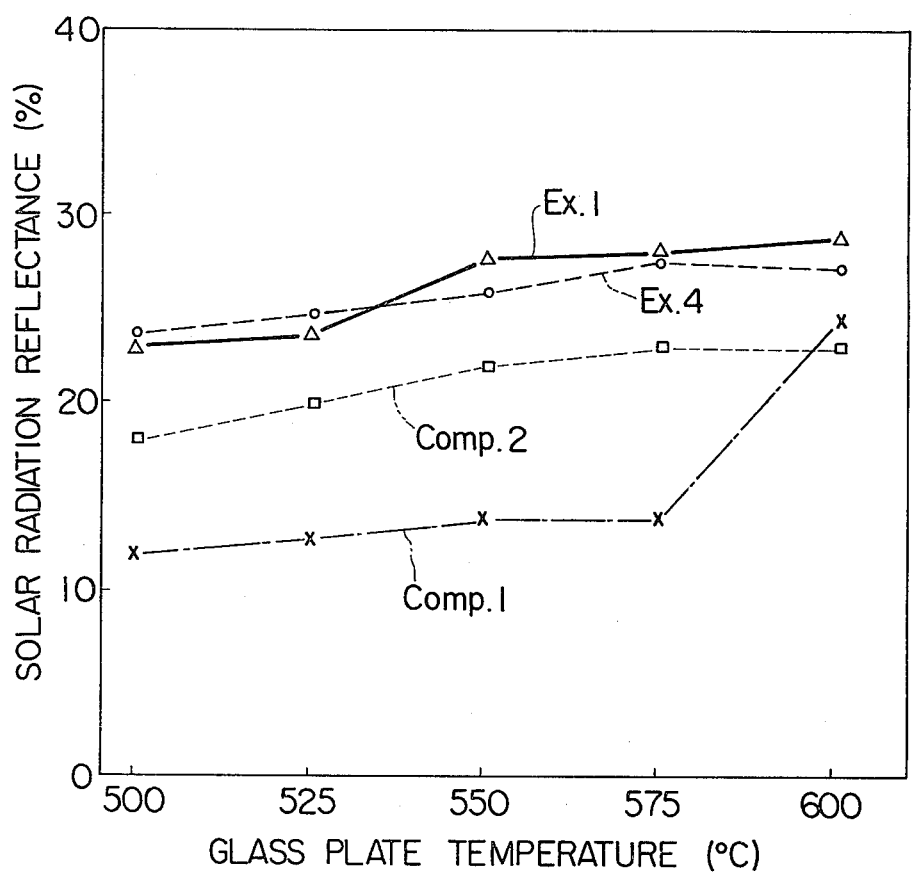
FIG. 2 is a graph showing solar radiation reflectance values of four samples of a titanium oxide film coated on a glass plate, two coated by a method according to the invention and the others not in accordance with the invention, as a function of a temperature at which the coating is accomplished.
Figure 3:
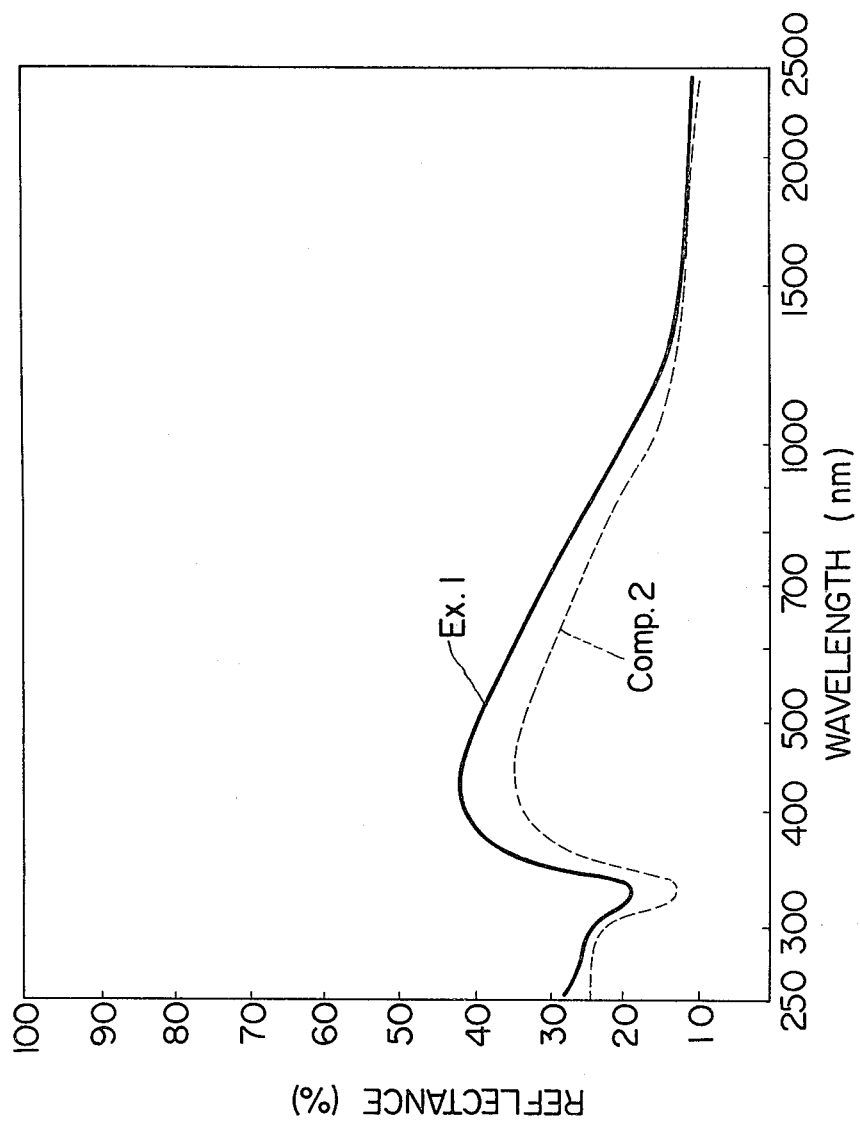
FIG. 3 shows a spectral reflectance curve for a heat-reflecting glass plate produced by a method according to the invention and another produced by a method not in accordance with the invention.

It was confirmed that the heat-reflecting glass plates produced in Examples 1-5 were all superior in reflectivity to those produced in Comparative Experiments 1 to 3. FIG. 2 shows solar radiation reflectances of the heat-reflecting glass plates of Examples 1 and 4 and Comparative Experiments 1 and 2, respectively obtained by performing the coating process at various temperatures. In FIG. 3, the curve in solid line is a spectral reflectance curve for the heat-reflecting glass plate produced in Example 1 by performing the coating process at 575° C., and the curve in broken line represents the same for the glass plate coated in Comparative Experiment 2 by performing the coating process at 575° C.

What is claimed is:

1. In a method of coating a glass surface with a heat-reflecting metal oxide film, which comprises titanium oxide as an essential component thereof, by applying a solution containing a thermally decomposable titanium compound dissolved in an organic solvent onto a surface of a glass body and heating the solution on the glass surface to cause thermal decomposition of the titanium compound to titanium oxide, the improvement comprising the use of a chelated titanium compound as said thermally decomposable titanium compound, said chelated titanium compound having at least one alkoxy group selected from the group consisting of propoxy groups and butoxy groups and at least one octyleneglycol chelate ligand.

2. A method according to claim 1, wherein said at least one alkoxy group consists of at least one isopropoxy group.

3. A method according to claim 1, wherein said chelated titanium compound has two isopropoxy groups.

4. A method according to claim 1, 2 or 3, wherein said chelated titanium compound has acetylacetonato as another chelate ligand.

5. A method according to claim 1, wherein said chelated titanium compound is selected from the group consisting of titanium diisopropoxy-bisoctyleneglycoxide, titanium diisopropoxy-monooctyleneglycoxy-monoacetylacetonate, titanium isopropoxy-trioctyleneglycoxide, titanium tripropoxy-octyleneglycoxide, titanium isopropoxy-octyleneglycoxy-diacetylacetonate, titanium dibutoxy-bisoctyleneglycoxide, titanium dibutoxy-monooctyleneglycoxy-monoacetylacetonate, titanium butoxy-trioctyleneglycoxide, titanium tributoxy-octyleneglycoxide and titanium butoxy-octyleneglycoxy-diacetylacetonate.

6. A method according to claim 1, wherein said temperature is in the range from about 500° C. to about 600° C.

7. In a method of coating a glass surface with a heat-reflecting metal oxide film, which comprises titanium oxide as an essential component thereof, by spraying a solution containing a thermally decomposable titanium compound dissolved in an organic solvent onto a surface of a glass body which has been heated in advance so that said surface is maintained at a temperature sufficient to cause thermal decomposition of the titanium compound to titanium oxide, the improvement comprising the use of a chelated titanium compound as said thermally decomposable titanium compound, said chelated titanium compound having at least one alkoxy group selected from the group consisting of propoxy groups and butoxy groups and at least one octyleneglycol chelate ligand.

8. A method according to claim 6, wherein said at least one alkoxy group consists of at least one isopropoxy group.

9. A method according to claim 6, wherein said chelated titanium compound has two isopropoxy groups.

10. A method according to claim 6, wherein said chelated titanium compound has acetylacetonato as another chelate ligand.

11. A method according to claim 6, wherein said chelated titanium compound is selected from the group consisting of titanium diisopropoxy-bisoctyleneglycoxide, titanium diisopropoxy-monooctyleneglycoxy-monoacetylacetonate, titanium isopropoxy-trioctyleneglycoxide, titanium tripropoxy-octyleneglycoxide, titanium isopropoxy-octyleneglycoxy-diacetylacetonate, titanium dibutoxy-bisoctyleneglycoxide, titanium dibutoxy-monooctyleneglycoxy-monoacetylacetonate, titanium butoxy-trioctyleneglycoxide, titanium tributoxy-octyleneglycoxide and titanium butoxy-octyleneglycoxy-diacetylacetonate.

* * * * *